(12) United States Patent
Shoji et al.

(10) Patent No.: US 10,739,946 B2
(45) Date of Patent: Aug. 11, 2020

(54) VEHICULAR DISPLAY DEVICE AND DISPLAY METHOD FOR VEHICULAR DISPLAY DEVICE (71) Applicant: Yazaki Corporation, Tokyo (JP)

(72) Inventors: Kazumasa Shoji, Shizuoka (JP); Ryoko Sone, Shimada (JP); Masayuki Ichikawa, Shizuoka (JP)

(73) Assignee: YAZAKI CORPORATION, Minato-ku (JP)

(*) Notice: Subject to any disclaimer, the term of this patent is extended or adjusted under 35 U.S.C. 154(b) by 307 days.

(21) Appl. No.: 15/865,729

(22) Filed: Jan. 9, 2018

(65) Prior Publication Data
US 2018/0217724 A1 Aug. 2, 2018

(30) Foreign Application Priority Data

Jan. 31, 2017 (JP) ................. 2017-015353

(51) Int. Cl.
G06F 3/0482 (2013.01)
G06F 3/0481 (2013.01)
(Continued)

(52) U.S. Cl.
CPC ............ G06F 3/0482 (2013.01); B60K 35/00 (2013.01); B60K 37/02 (2013.01); B60K 37/04 (2013.01); G06F 3/04817 (2013.01); B60K 2370/11 (2019.05); B60K 2370/113 (2019.05); B60K 2370/115 (2019.05); B60K 2370/151 (2019.05);
(Continued)

(58) Field of Classification Search
CPC ... G06F 3/0482; G06F 3/04817; B60K 35/00; B60K 37/04; B60K 37/02; B60K 2370/1529; B60K 2370/165; B60K 2370/81; B60K 2370/152; B60K 2370/682; B60K 2370/113; B60K 2370/115; B60K 2370/191; B60K 2370/11; B60K 2370/151
See application file for complete search history.

(56) References Cited

U.S. PATENT DOCUMENTS 7,603,214 B2* 10/2009 Tanaka ................... B60K 37/06
 701/36
8,768,568 B2* 7/2014 Uhlmann ................ B61L 29/24
 340/901

(Continued)

FOREIGN PATENT DOCUMENTS

JP 2016-223988 A 12/2016

Primary Examiner — Russell Frejd
(74) Attorney, Agent, or Firm — Sughrue Mion, PLLC (57) ABSTRACT A vehicular display device includes an image display device that is arranged in front of a driver in a vehicle and configured to display an image. The image displayed in an information display area of the image display device includes an information image displaying information according to a mode selected out of a plurality of modes, and a menu image in which a plurality of titles corresponding to the respective modes are arranged in a lateral direction of the image and for which switching is made between display and hidden-display. When an operating input to switch the modes is made while the menu image is hidden, the image display device displays the menu image, and performs animation display that changes a title displayed as active out of the titles from a title corresponding to a mode before change to a title corresponding to a mode after the change.

6 Claims, 8 Drawing Sheets (51) Int. Cl.
*B60K 37/04* (2006.01)
*B60K 37/02* (2006.01)
*B60K 35/00* (2006.01)

(52) U.S. Cl.
CPC ............... *B60K 2370/152* (2019.05); *B60K 2370/1529* (2019.05); *B60K 2370/165* (2019.05); *B60K 2370/191* (2019.05); *B60K 2370/682* (2019.05); *B60K 2370/81* (2019.05)

(56) References Cited

U.S. PATENT DOCUMENTS

| | | | |
|---|---|---|---|
| 2011/0202862 A1* | 8/2011 | Kramer | B60K 35/00 715/771 |
| 2012/0089299 A1* | 4/2012 | Breed | B60C 11/24 701/36 |
| 2014/0336876 A1* | 11/2014 | Gieseke | G01C 21/365 701/36 |
| 2015/0015479 A1* | 1/2015 | Cho | G06F 3/013 345/156 |
| 2017/0115826 A1* | 4/2017 | Pryor | G06F 3/0425 |
| 2017/0364148 A1* | 12/2017 | Kim | B60K 37/06 |
| 2020/0005029 A1* | 1/2020 | Kramer | H04M 1/6091 |

* cited by examiner

VEHICULAR DISPLAY DEVICE AND DISPLAY METHOD FOR VEHICULAR DISPLAY DEVICE

CROSS-REFERENCE TO RELATED APPLICATION(S)

The present application claims priority to and incorporates by reference the entire contents of Japanese Patent Application No. 2017-015353 filed in Japan on Jan. 31, 2017.

BACKGROUND OF THE INVENTION

1. Field of the Invention

The present invention relates to a vehicular display device and a display method for a vehicular display device.

2. Description of the Related Art

Conventionally, there have been vehicular display devices that switch modes of image display. Japanese Patent Application Laid-open No. 2016-223988 discloses a technology of a vehicular display device that includes an image display unit and a controller that causes the image display unit to display an image. The controller discussed in Japanese Patent Application Laid-open No. 2016-223988, at the time of switching from a first screen including a first title image and a first content image to a second screen including a second title image and a second content image, performs a first procedure in which the luminance of the first screen is attenuated, a second procedure in which the first content image is made hidden and a part of the second screen is displayed at a certain place in an area where the first content image was made hidden, and a third procedure in which the first title image is made hidden and the entire second screen is displayed.

As for making the mode transition of image display in response to an operating input match the sense of a user, there still is a room for improvement. For example, if it is possible to visually indicate that it is the mode transition in which the operating input has been correctly reflected, it facilitates making the mode transition match the sense of the user.

SUMMARY OF THE INVENTION

An object of the present invention is to provide a vehicular display device and a display method for a vehicular display device capable of matching a mode transition of image display with a sense of a user.

In order to achieve the above mentioned object, a vehicular display device according to one aspect of the present invention includes an image display device that is arranged in front of a driver in a vehicle and configured to display an image, wherein the image displayed in an information display area of the image display device includes an information image displaying information according to a mode selected out of a plurality of modes, and a menu image in which a plurality of titles corresponding to the respective modes are arranged in a lateral direction of the image and for which switching is made between display and hidden-display, and when an operating input to switch the modes is made while the menu image is hidden, the image display device displays the menu image and performs animation display that changes a title displayed as active out of the titles from a title corresponding to a mode before change to a title corresponding to a mode after the change.

In order to achieve the above mentioned object, a display method for a vehicular display device according to another aspect of the present invention includes a step of displaying, on an image display device arranged in front of a driver in a vehicle, an information image according to a mode selected out of a plurality of modes, and a menu image in which a plurality of titles corresponding to the respective modes are arranged in a lateral direction of the image, wherein the step of displaying includes displaying the menu image and performing animation display that changes a title displayed as active out of the titles from a title corresponding to a mode before change to a title corresponding to a mode after the change, when an operating input to switch the modes is made while the menu image is hidden.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes in detail a vehicular display device and a display method for a vehicular display device according to an exemplary embodiment of the present invention with reference to the accompanying drawings. The invention, however, is not intended to be limited by the embodiment. The constituent elements in the following embodiment include those that a person skilled in the art can easily assume or that are substantially identical.

Embodiment

Figure 1:
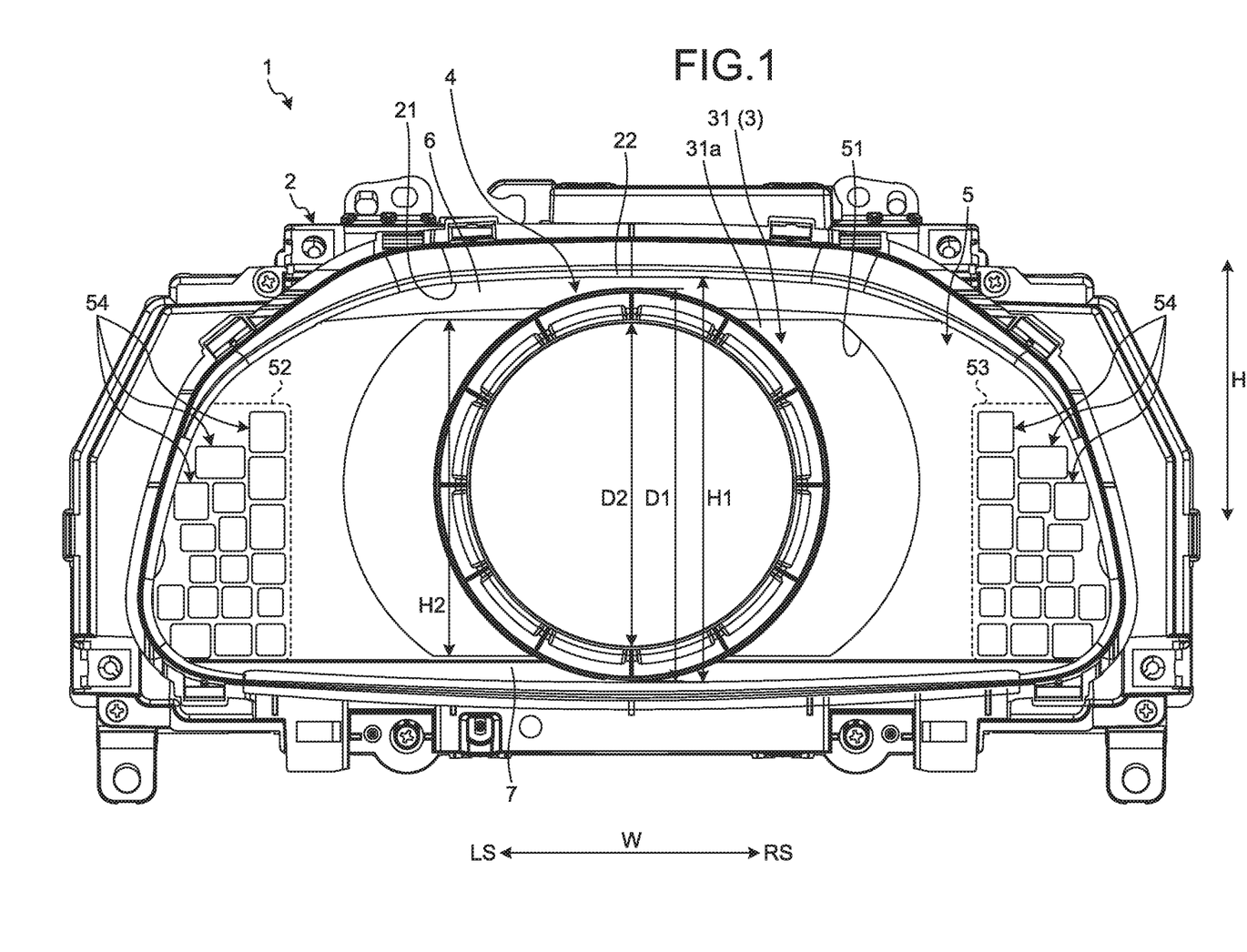
FIG. 1 is a front view of a vehicular display device according to an embodiment.

With reference to FIGS. 1 to 8, the exemplary embodiment will be described. The present embodiment relates to a vehicular display device and a display method for a vehicular display device. FIG. 1 is a front view of a vehicular display device according to an embodiment; FIG.

Figure 2:
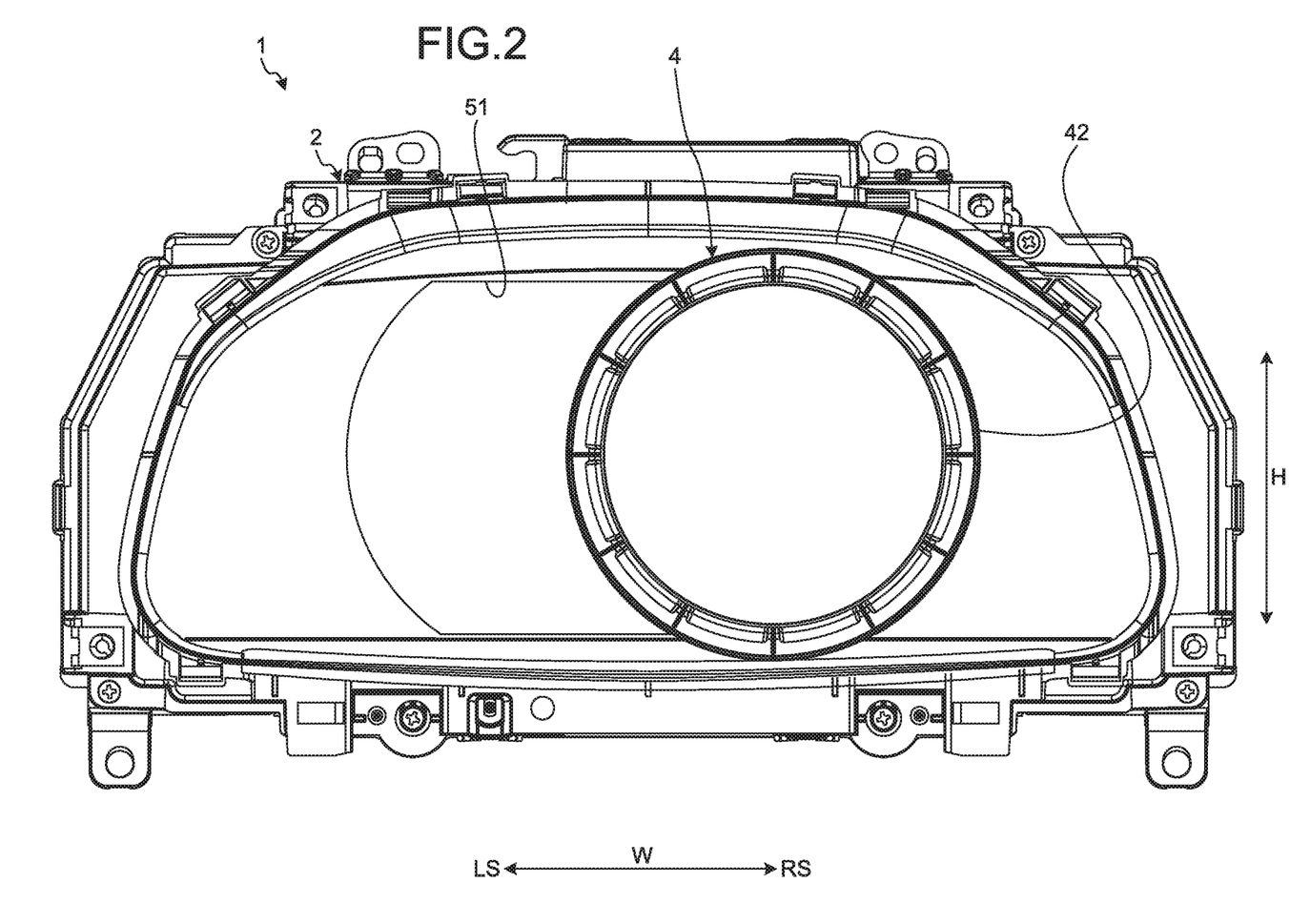
FIG. 2 is a front view illustrating a situation that a ring is at a second position in the vehicular display device in the embodiment.
Figure 3:
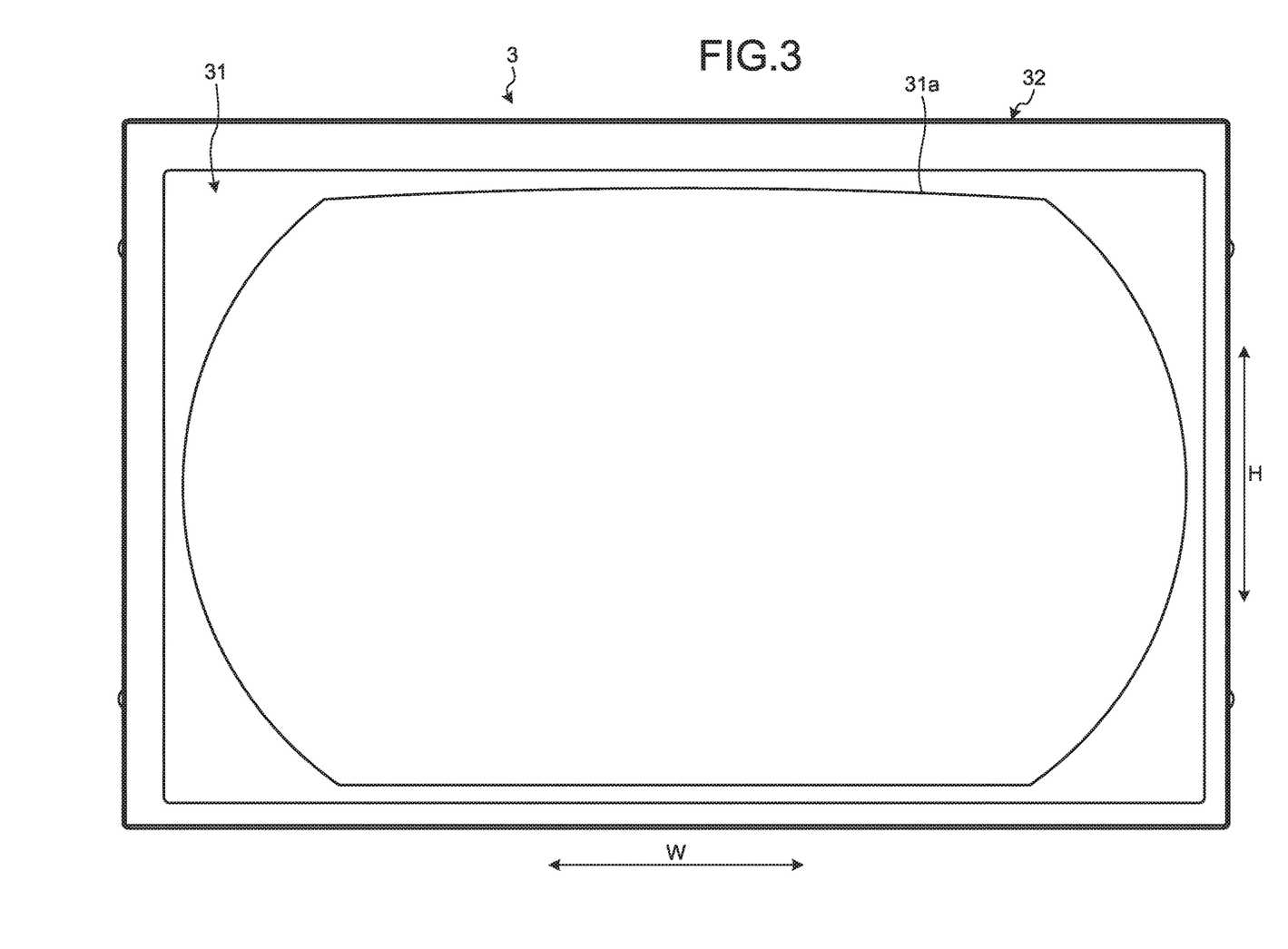
FIG. 3 is a front view of an image display device in the embodiment.
Figure 4:
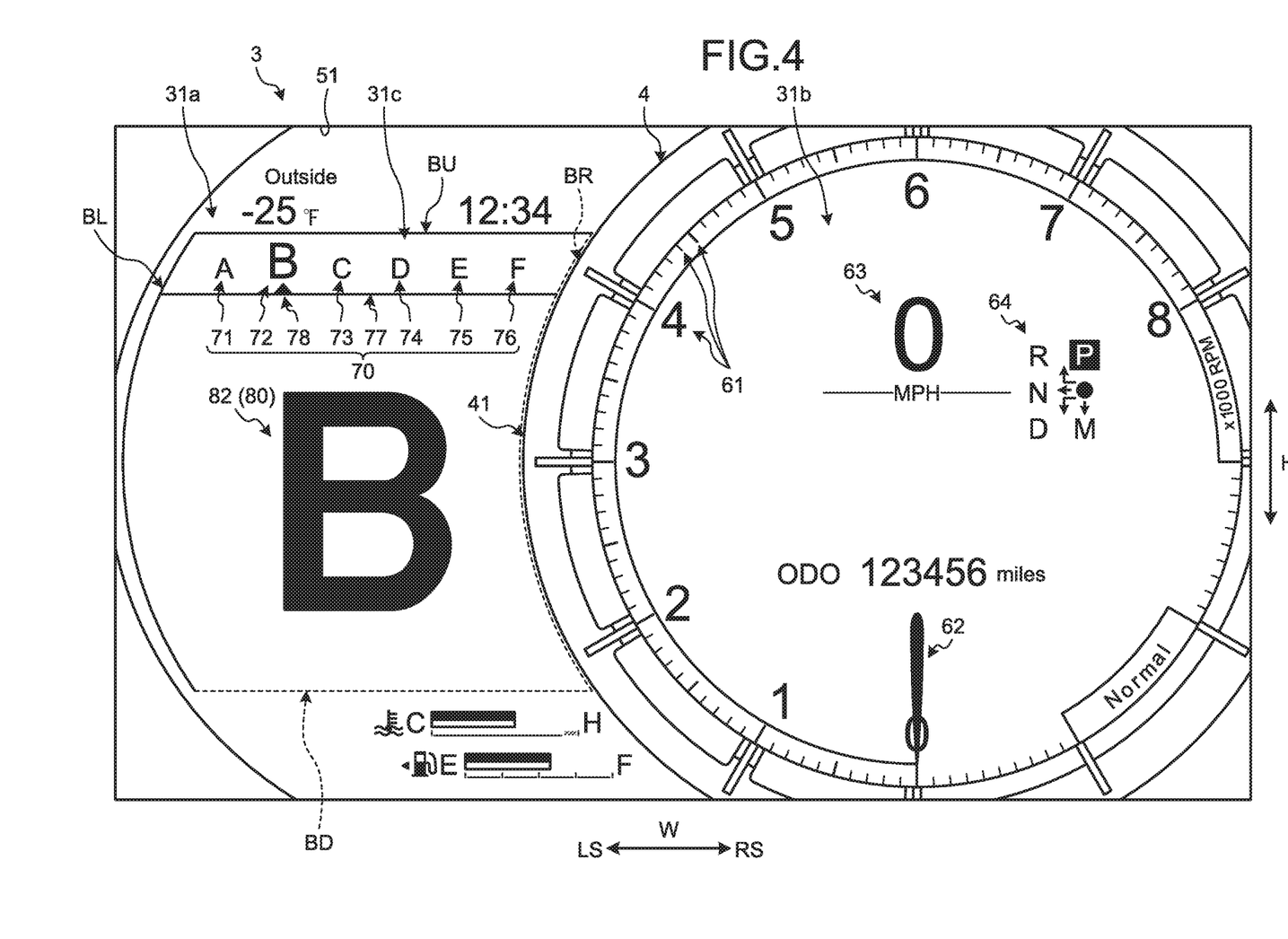
FIG. 4 is a diagram illustrating a situation at the time of having completed mode transition in the image display device of the embodiment.
Figure 5:
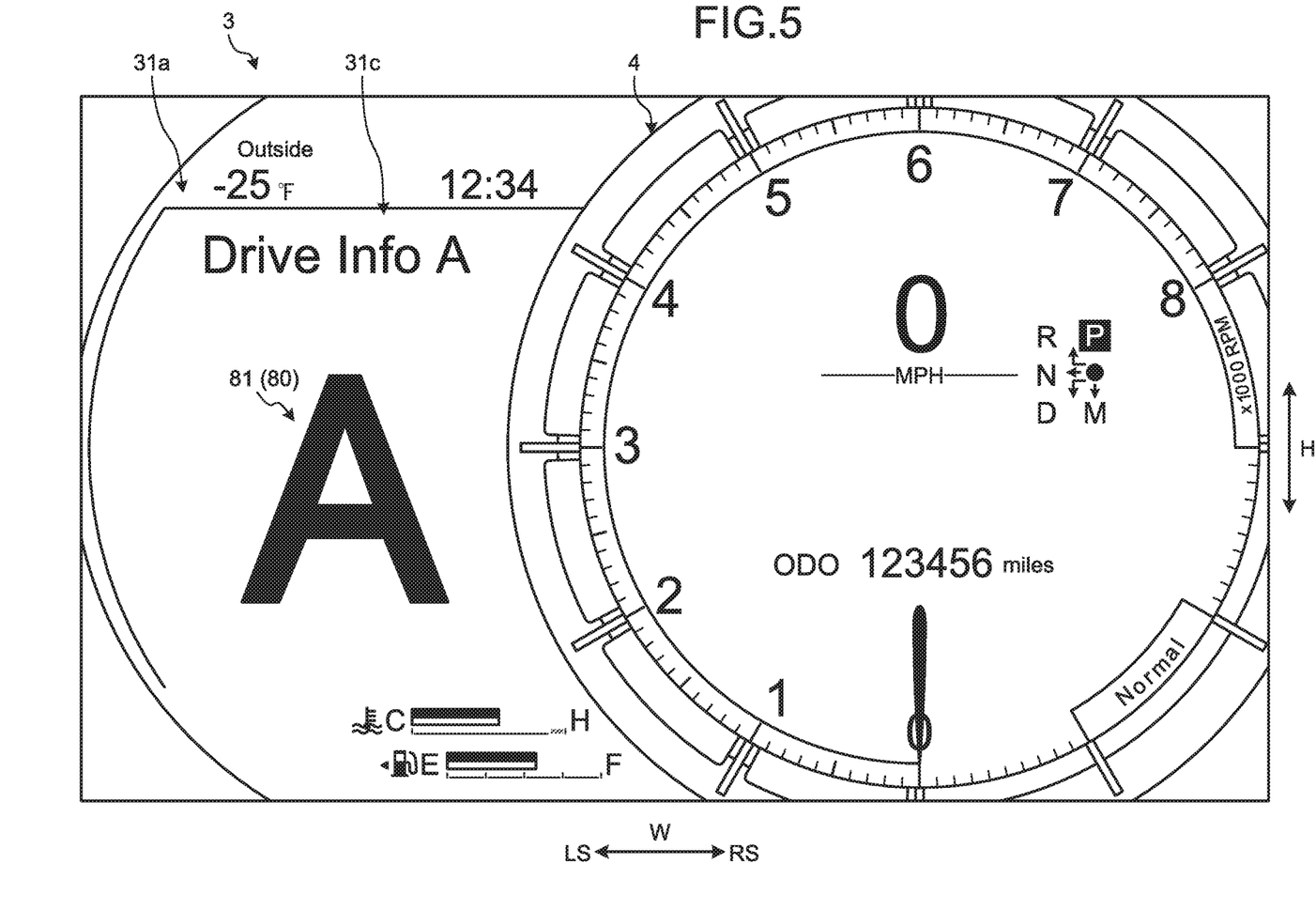
FIG. 5 is a diagram illustrating a situation before starting the mode transition in the image display device of the embodiment.
Figure 6:
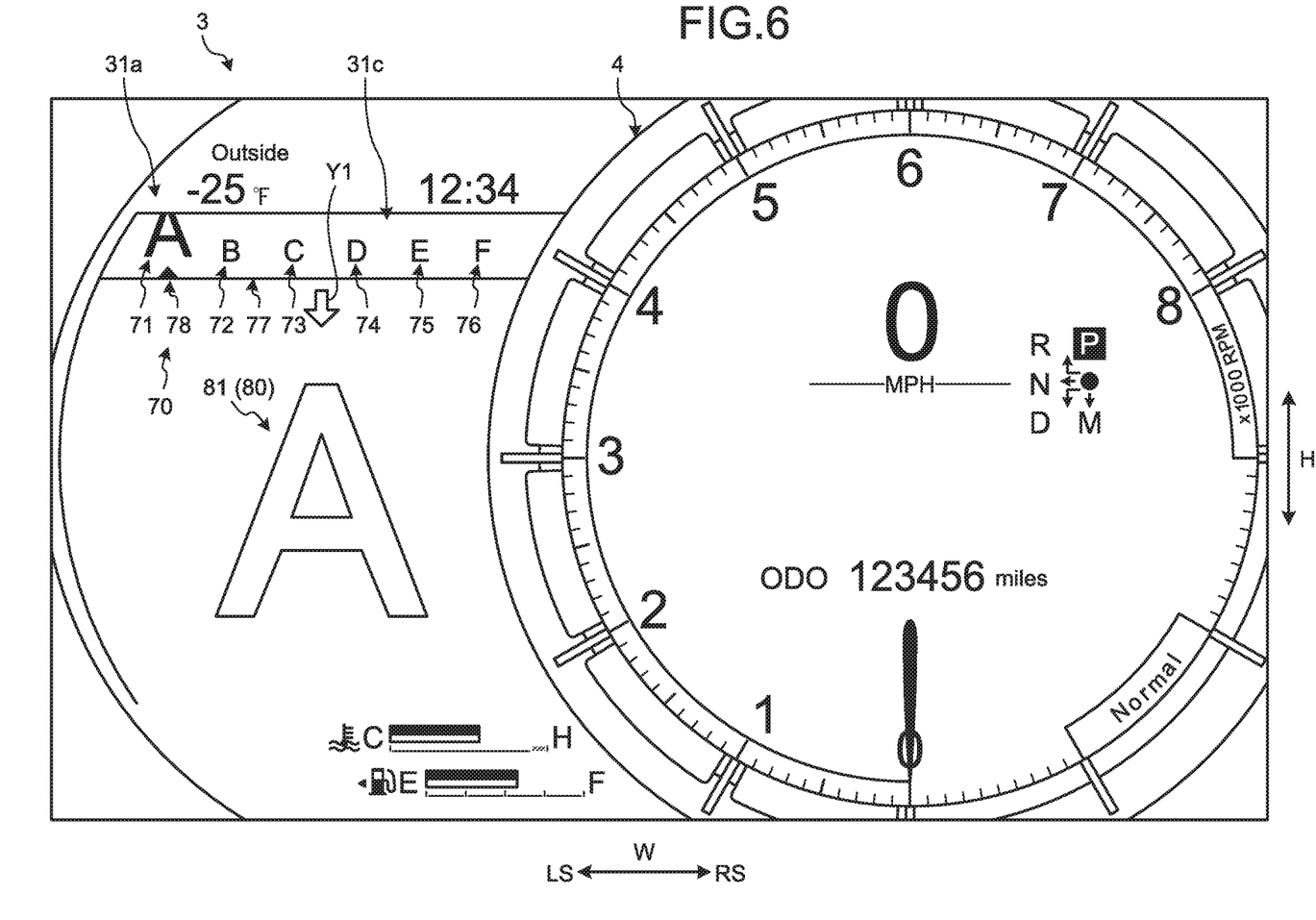
FIG. 6 is a diagram illustrating a situation that animation display of a menu image has been started in the image display device of the embodiment.
Figure 7:
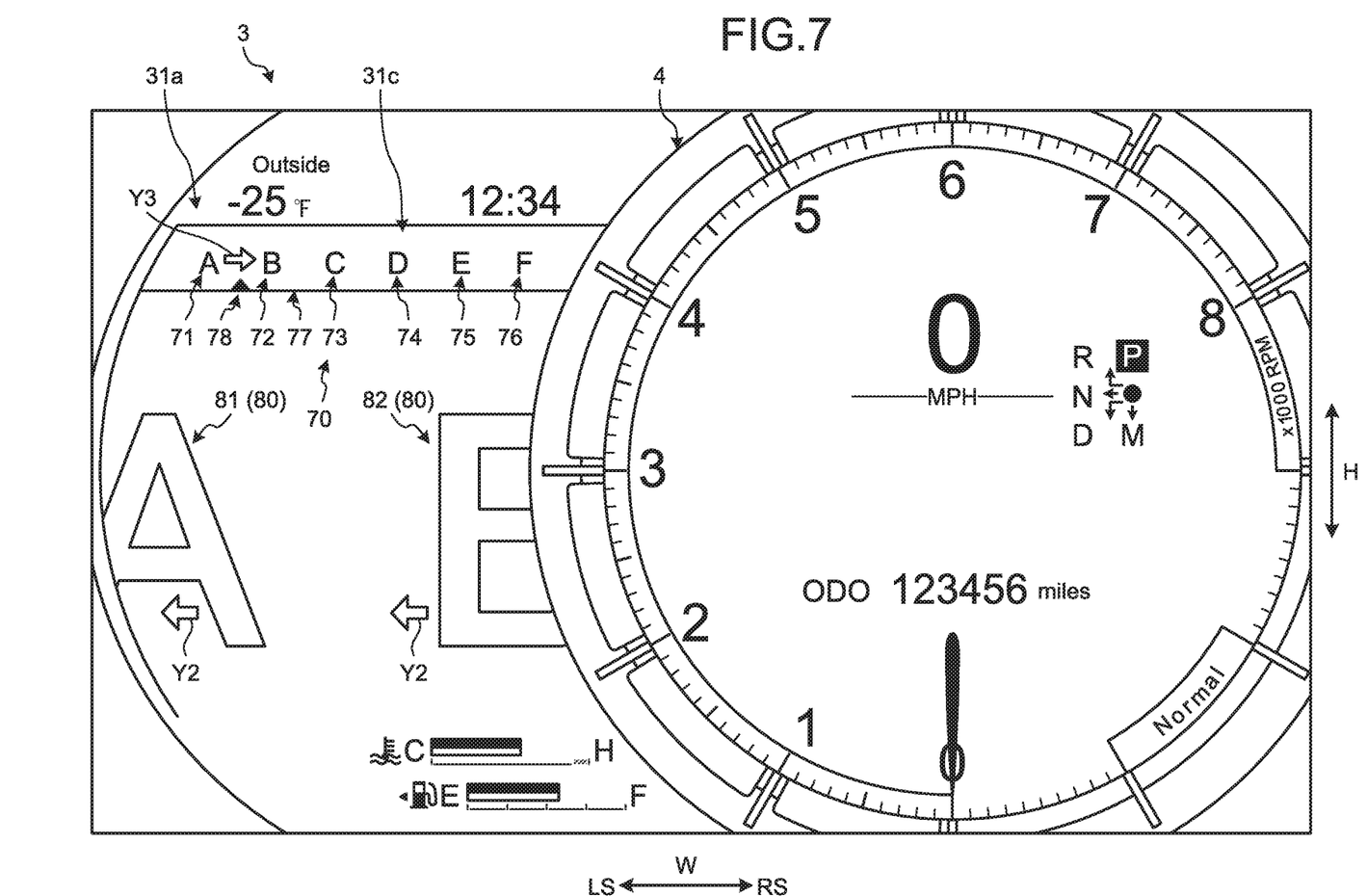
FIG. 7 is a diagram illustrating a situation in the middle of the animation display of the menu image in the image display device of the embodiment.
Figure 8:
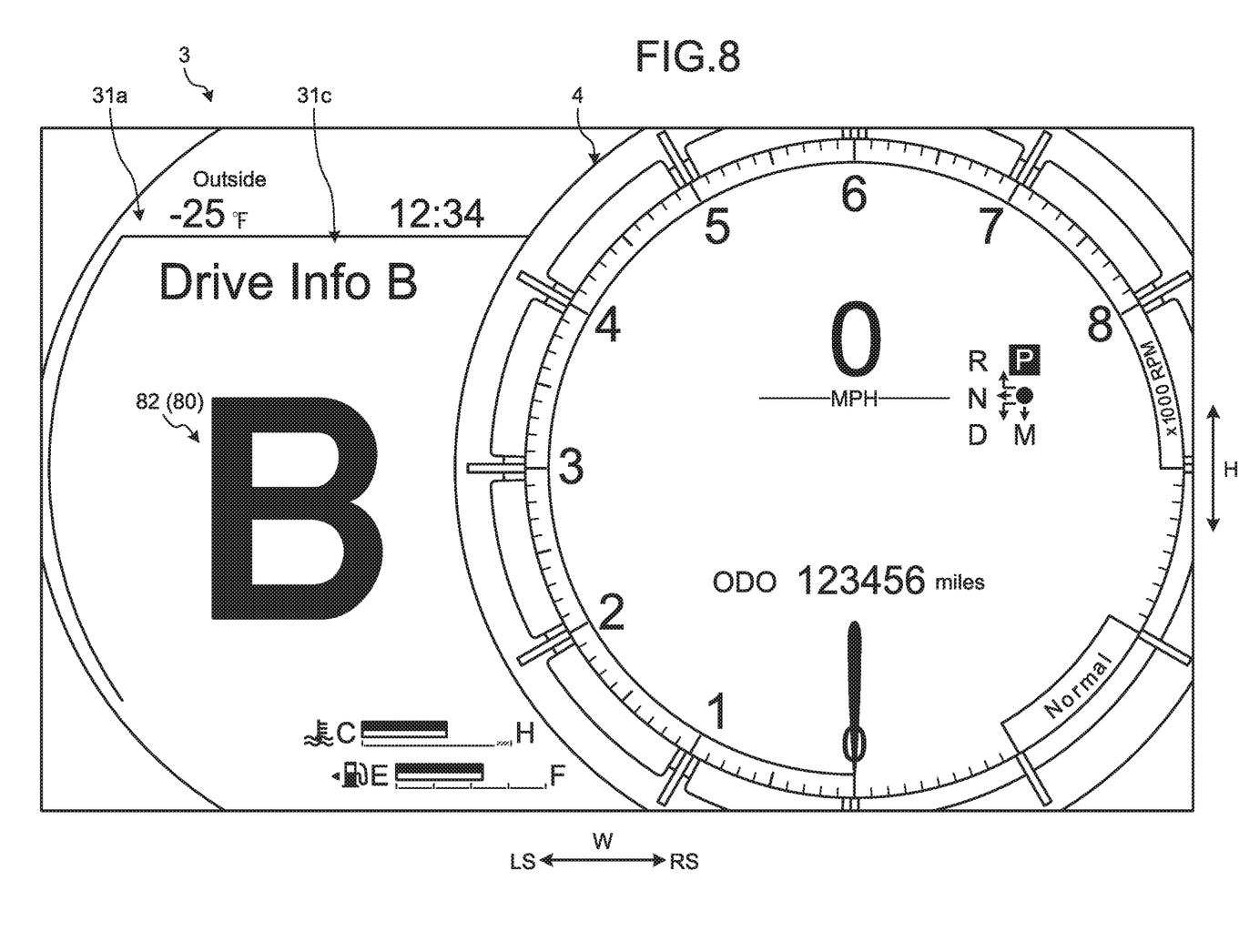
FIG. 8 is a diagram illustrating a situation that the menu image has become hidden after having completed the mode transition in the image display device of the embodiment.

2 is a front view illustrating a situation that a ring is at a second position in the vehicular display device in the embodiment; FIG. 3 is a front view of an image display device in the embodiment; FIG. 4 is a diagram illustrating a situation at the time of having completed mode transition in the image display device of the embodiment; FIG. 5 is a diagram illustrating a situation before starting the mode transition in the image display device of the embodiment; FIG. 6 is a diagram illustrating a situation that animation display of a menu image has been started in the image display device of the embodiment; FIG. 7 is a diagram illustrating a situation in the middle of the animation display of the menu image in the image display device of the embodiment; and FIG. 8 is a diagram illustrating a situation that the menu image has become hidden after having completed the mode transition in the image display device of the embodiment.

As illustrated in FIG. 1, a vehicular display device 1 in the present embodiment includes a housing 2, an image display device 3, a ring 4, and a dial plate 5. The vehicular display device 1 of the present embodiment has a display function as a vehicular metering device. The vehicular display device 1 is arranged in front of a driver in a vehicle and is disposed on an instrument panel, for example.

The housing 2 houses therein and holds members and devices including the image display device 3, the ring 4, and the dial plate 5. The housing 2 has an opening 21. The housing 2 is arranged so that the opening 21 can face toward the driver side, in other words, toward the rear of the vehicle. In the following description of the vehicular display device 1, the rear side in the front-back direction of the vehicle is referred to as "front face side" and the front side in the front-back direction of the vehicle is referred to as "back-surface side". The vehicular display device 1 is arranged so that the front face side can face the driver. The driver visually recognizes the image display device 3, the ring 4, and the dial plate 5 via the opening 21.

As illustrated in FIG. 1, the housing 2 viewed from the front has a rectangular shape in which the vehicle width direction W is longer in length than the vehicle vertical direction H. The housing 2 is formed of metal, synthetic resin, or the like. On the front of the housing 2, provided is a facing 22 projecting from the opening 21 toward the front face side. The facing 22 is a tubular constituent portion and is integrally formed with a main body portion of the housing 2. The front face side of the facing 22 is closed with a transparent cover.

The dial plate 5 is a plate-like member and is arranged so as to close the opening 21 from the back-surface side. The dial plate 5 is formed of synthetic resin, for example. The dial plate 5 is secured to the housing 2. At the central portion of the dial plate 5, a window 51 is provided. The window 51 is a portion that transmits light. The window 51 may be a through hole that penetrates the dial plate 5, or may be a translucent area provided on the dial plate 5. The window 51 has a horizontally long shape in which the vehicle width direction W is longer in length than the vehicle vertical direction H. The window 51 of the present embodiment has a shape in which the short side portions of the rectangle are made to project in a circular arc shape toward the vehicle width direction W. The circular arc portion of the window 51 corresponds in shape to the ring 4.

On both sides of the window 51 in the vehicle width direction W, display design areas 52 and 53 are provided. The display design area 52 is arranged on one side in the vehicle width direction W with respect to the window 51 and the display design area 53 is arranged on the other side in the vehicle width direction W with respect to the window 51. In each of the display design areas 52 and 53, a plurality of display designs 54 are arranged. The display designs 54 are graphics and characters indicating a variety of information concerning the vehicle. The display designs are void areas of print to the dial plate 5 and are translucent areas, for example. On the back-surface side of the display design areas 52 and 53, a light source is arranged for each display design 54. The display designs 54 display the characters and graphics when the corresponding light source is turned on.

The image display device 3 is arranged on the back-surface side of the dial plate 5. The image display device 3 of the present embodiment is a liquid-crystal display device such as a thin-film transistor liquid crystal display (TFT-LCD). As illustrated in FIG. 3, the image display device 3 includes a liquid-crystal display unit 31 and a frame member 32. The frame member 32 surrounds the edge portions of the liquid-crystal display unit 31 and supports the liquid-crystal display unit 31.

The image display device 3 is arranged so that the liquid-crystal display unit 31 can face the front face side. On the back-surface side of the liquid-crystal display unit 31, a backlight unit is arranged. The image display device 3 further includes a control unit that controls the liquid-crystal display unit 31 and the backlight unit. The liquid-crystal display unit 31 displays any desired image in response to a command of the control unit. The image displayed on the liquid-crystal display unit 31 is projected toward the front face side by the light the backlight unit emits.

The size of the window 51 of the dial plate 5 is smaller than the size of the liquid-crystal display unit 31. The window 51 faces a principal portion of the liquid-crystal display unit 31. From the driver side, the principal portion of the liquid-crystal display unit 31 is visible via the window 51. The dial plate 5 masks from the driver side, by the peripheral portions of the window 51, the edge portions of the liquid-crystal display unit 31 and the frame member 32 that holds the liquid-crystal display unit 31. In the liquid-crystal display unit 31, the area corresponding to the window 51 is referred to as "image display area 31a" (see FIG. 3). The image display area 31a is an area that various images are displayed and is an area visible from the driver side.

Returning to FIG. 1, the ring 4 is a member arranged on the front face side of the dial plate 5. The ring 4 of the present embodiment has an annular shape. The outer diameter D1 of the ring 4 is slightly smaller than the maximum width H1 in the vehicle vertical direction H of the opening 21. The inner diameter D2 of the ring 4 is smaller than the width H2 in the vehicle vertical direction H of the window 51. The upper end of the ring 4 is positioned on the upper side of the vehicle than the upper end of the window 51, and the lower end of the ring 4 is positioned on the lower side of the vehicle than the lower end of the window 51.

The ring 4 of the present embodiment is movable in the vehicle width direction W relatively to the dial plate 5. More specifically, the upper end portion of the ring 4 is coupled to a drive mechanism via an upper-side holding member, which is not depicted. The upper-side holding member is masked from the driver side by a cover member 6 attached to the housing 2. The drive mechanism includes a motor and gears, transforms a rotary torque generated by the motor into a driving force of the vehicle width direction W, and transmits it to the ring 4. The drive mechanism moves the ring 4 toward the left-hand side LS or the right-hand side RS of the vehicle width direction W, by switching the rotational direction of the motor.

The lower end portion of the ring 4 is coupled to a guide portion via a lower-side holding member, which is not depicted. The lower-side holding member is masked from the driver side by a cover member 7 attached to the housing 2. The guide portion is a guide rail or the like that extends along the vehicle width direction W. By the guide portion, the movable range of the ring 4 in the vehicle width direction W is regulated. The ring 4 of the present embodiment is movable in the vehicle width direction W between a first position illustrated in FIG. 1 and a second position illustrated in FIG. 2. The first position is a position on the leftmost side LS of the vehicle in the movable range of the ring 4. The second position is a position on the rightmost side RS of the vehicle in the movable range of the ring 4.

The first position in the present embodiment is a central portion of the vehicle width direction W in the opening 21. The first position is also a central portion of the vehicle width direction W in the window 51. The second position in the present embodiment is a position close to an end portion on the right-hand side RS of the vehicle in the opening 21. The second position is an end portion on the right-hand side RS of the vehicle in the window 51. More specifically, as illustrated in FIG. 2, in the ring 4 at the second position, a right-end portion 42 thereof overlaps with the right-end portion of the window 51.

As illustrated in FIG. 4, the image display device 3 displays, in the image display area 31a, scale images 61, a pointer image 62, a vehicle speed image 63, a shift position image 64, and others. The image display device 3 displays these images 61, 62, 63, and 64 in an inner area 31b that is an area on the inner side than the ring 4. The inner area 31b is a partial area of the image display area 31a. The position of the inner area 31b may be changed depending on the move of the ring 4 along the vehicle width direction W. However, the position of the inner area 31b is not limited thereto, and it may be a position surrounded by the ring 4 when the ring 4 is at the first position, or may be a position surrounded by the ring 4 when the ring 4 is at the second position. FIG. 4 illustrates a display image when the ring 4 is at the second position.

The scale images 61 are displayed as indexes of physical quantity corresponding to the output speed of a drive source mounted on the vehicle. In the present embodiment, the drive source is an engine and the physical quantity corresponding to the output speed is a rotational speed [RPM]. The pointer image 62 is displayed as a pointer that indicates the current value of the rotational speed of the engine. More specifically, the pointer image 62 is displayed so as to point, out of a plurality of scale images 61 arranged along the circumferential direction, the scale image 61 of the position corresponding to the current rotational speed of the engine.

The vehicle speed image 63 is an image of numerals indicating the current traveling speed of the vehicle. The vehicle speed image 63 is displayed at the position on the upper side of the image than the center of the inner area 31b in the vertical direction. The shift position image 64 is an image indicating the current shift position. The shift position image 64 is displayed on the right-hand side of the vehicle speed image 63 in the lateral direction of the image, that is, on the right-hand side RS of the vehicle width direction W.

The image display device 3 of the present embodiment displays a variety of information in an information display area 31c. The image display device 3 displays various information images 80 according to a mode in the information display area 31c. The information display area 31c, as illustrated in FIG. 4, is an area on the lateral side of the ring 4 located at the second position, out of the image display area 31a. The information display area 31c of the present embodiment is an area on the left-hand side in the lateral direction of the image than the ring 4. The information display area 31c is an area surrounded by an upper-end boundary BU, a lower-end boundary BD, a left-end boundary BL, and a right-end boundary BR.

The upper-end boundary BU and the lower-end boundary BD are straight lines extending in the vehicle width direction W, in other words, they are straight lines extending in the lateral direction of the image. The left-end boundary BL of the information display area 31c is in a circular arc shape curved toward the left-hand side LS. The right-end boundary BR of the information display area 31c is in a circular arc shape curved toward the left-hand side LS. The right-end boundary BR corresponds to the outermost circumference of a left-end portion 41 of the ring 4.

A shape of the left-end boundary BL and a shape of the right-end boundary BR correspond to a shape of the circular arc of the outer circumference of the ring 4. In the present embodiment, the radius of the circular arc of the left-end boundary BL and the right-end boundary BR corresponds in shape to the radius of the circular arc of the outermost circumference of the left-end portion 41 of the ring 4.

The image displayed in the information display area 31c is switched depending on an operating input by a user to an input unit. The user who performs the operating input is typically a driver who drives the vehicle. In the following description, it is so described that the operating input is made by the driver. The driver manipulates the display content of the information display area 31c by the operation of pressing a directional pad or the like, for example. The directional pad is arranged on a steering wheel, for example. In the vehicular display device 1 of the present embodiment, the image display mode of the information display area 31c is switched by pressing the right and left buttons of the directional pad. In each mode, by pressing the up and down buttons of the directional pad, the display form and the like in the mode can be switched.

The image display device 3 displays the information image 80 corresponding to a selected mode, out of a plurality of modes, in the information display area 31c. In the image display device 3 of the present embodiment, six modes from a first mode to a sixth mode are selectable. Examples of the modes include a mode to display travel information, a mode to display audio information, a mode to display the orientation of vehicle travel direction, a mode to display information about a drive support system, a mode to display caution information, and a mode to display configuration information.

The image display device 3 of the present embodiment further displays a menu image 70 in the information display area 31c. The menu image 70, as illustrated in FIG. 4, is an image in which a plurality of titles 71, 72, 73, 74, 75, and 76 corresponding to the respective modes are arranged in the lateral direction of the image. The titles 71, 72, 73, 74, 75, and 76 are arranged in this order from the left-hand side toward the right-hand side. The first title 71, the second title 72, the third title 73, the fourth title 74, the fifth title 75, and the sixth title 76 are titles (tabs) corresponding to the first mode, the second mode, the third mode, the fourth mode, the fifth mode, and the sixth mode, respectively.

The menu image 70 of the present embodiment further includes a boundary image 77 and a cursor image 78. The boundary image 77 is an image indicating the boundary of the lower end in the vertical direction of the image in the menu image 70. That is, the boundary image 77 is a boundary between the area of the menu image 70 and the area of the information image 80. The cursor image 78 is an image indicating the title corresponding to an active mode. The cursor image 78 is an image projecting toward the upper side of the image from the boundary image 77. The shape of the cursor image 78 is a triangle, a semicircle, or the like, for example. In FIG. 4, the active mode is the second mode, and the cursor image 78 is displayed at the position indicating the second title 72. The second title 72 corresponding to the active mode is displayed as active. The second title 72 displayed as active is displayed in a form different from those of the other titles 71, 73, 74, 75, and 76. For example, between the title displayed as active and the title displayed as inactive, the titles differ in luminance, color, size, and others.

The image display device 3 of the present embodiment switches the display and hidden-display of the menu image 70. When a predetermined hidden-display determination condition satisfies while the menu image 70 is displayed, the image display device 3 switches the menu image 70 from a display state to a hidden-display state. The hidden-display determination condition is that a predetermined time elapses while no operating input is made on the image displayed in the information display area 31c. In the present embodiment, when a predetermined time elapses without an operating input being made on the directional pad while the menu image 70 is displayed, the menu image 70 is made hidden. When the transition of the menu image 70 is made from the display state into the hidden-display state, the image display device 3 causes the menu image 70 to slide out toward the upper side of the image.

When the menu image 70 is made hidden, the amount of information in the image display area 31a can be decreased. While the menu image 70 is high in necessity and priority for the driver at the time of mode transition, the necessity and priority become low after the mode transition is completed. The vehicular display device 1 of the present embodiment can improve the visibility of the image display area 31a because the information for which the priority became low is made hidden. When causing the menu image 70 to be hidden, another image may be displayed in the area where the menu image 70 has been displayed.

When an operating input to switch the modes is made, the image display device 3 performs the transition of display mode in the information display area 31c from a mode before change to a mode after the change. When the operating input to switch the modes is made while the menu image 70 is hidden, the vehicular display device 1 of the present embodiment displays the menu image 70 and performs animation display that changes the title displayed as active out of the titles 71, 72, 73, 74, 75, and 76 from the title corresponding to the mode before change to the title corresponding to the mode after the change, as described with reference to FIGS. 4 to 8 in the following. The behavior of the image display device 3 of the present embodiment will be described with an example in which the operating input of switching the image display mode from the first mode to the second mode was made.

FIG. 5 illustrates the image display device 3 in the first mode. In other words, in FIG. 5, illustrated is the information display area 31c before starting the mode transition of image display. In the information display area 31c, as the information image 80, a first mode information image 81 is displayed. Because the hidden-display determination condition is satisfied, the menu image 70 is hidden. The operating input of mode switch from the first mode to the second mode is an operation of pressing the right button on the directional pad. When the pressing operation on the right button is made and the mode switch to the second mode is instructed, the image display device 3 displays the menu image 70. The image display device 3, as illustrated in FIG. 6, displays the menu image 70 so as to slide in from the upper end of the information display area 31c. The image display device 3, as indicated with the arrow Y1 in FIG. 6, displays the titles 71, 72, 73, 74, 75, and 76, the boundary image 77, and the cursor image 78 so as to slide in toward the lower side in the vertical direction of the image.

In the menu image 70 displayed sliding in, the first title 71 is displayed as active. That is, the display of the menu image 70 is started in a state that the first title 71 corresponding to the mode before change is displayed as active. The first title 71 is displayed in a size larger than those of the other titles 72, 73, 74, 75, and 76, for example. The first title 71 may be displayed at a luminance higher than those of the other titles 72, 73, 74, 75, and 76. The cursor image 78 is displayed immediately below the first title 71 so as to point the first title 71.

Upon displaying the menu image 70, the image display device 3 performs animation display that changes the title displayed as active from the first title 71 to the second title 72. The image display device 3, as illustrated in FIG. 7, causes the size and luminance of the first title 71 to be the same as those of the other titles 72, 73, 74, 75, and 76, and moves the cursor image 78 toward the right-hand side of the image as indicated with the arrow Y3.

The image display device 3 stops moving the cursor image 78 at the position pointing the second title 72 as illustrated in FIG. 4, and displays the second title 72 as active in a size larger and at a luminance higher than those of the other titles 71, 73, 74, 75, and 76. This completes the animation display that changes the title displayed as active.

The image display device 3 of the present embodiment performs animation display of the information image 80 in parallel with the animation display of the menu image 70. As illustrated in FIG. 7, in the animation display of the information image 80, the image display device 3 causes the first mode information image 81 to slide out and displays a second mode information image 82 so as to slide in. The direction of sliding out and sliding in is the lateral direction of the image as indicated with the arrow Y2 in FIG. 7. The image display device 3 causes the first mode information image 81 to slide out toward the left-hand side to the left end of the information display area 31c, and displays the second mode information image 82 so as to slide in from the right end of the information display area 31c toward the left-hand side. In the display of sliding out and sliding in, the luminance and transmissivity of the information image 80 may be lowered.

The image display device 3 ends the display of sliding in when the second mode information image 82 moves to a certain display position illustrated in FIG. 4. When the luminance and transmissivity of the information image 80 have been lowered in the display of sliding in, those values are changed to the luminance and transmissivity of a normal display. The image display device 3 may end the animation display of the menu image 70 at the same timing as that of the animation display of the information image 80. When the animation display of the menu image 70 and the animation display of the information image 80 are completed, the mode transition is completed.

When a predetermined time elapses while no operating input is made on the directional pad after the mode transition is completed, the image display device 3 causes the menu image 70 to be hidden as illustrated in FIG. 8. When causing the menu image 70 to be hidden, the image display device 3 causes the menu image 70 to slide out toward the upper end of the information display area 31c.

In contrast to the above, when the title displayed as active is changed to the title of the left-hand side LS relatively, the image display device 3 regards the right-hand direction as the direction of the information image 80 sliding out and sliding in. For example, it is assumed that the left button of the directional pad was pressed and the mode switch from the second mode to the first mode was instructed. In this case, the image display device 3, in the menu image 70, moves the cursor image 78 from the second title 72 toward the first title 71. The title displayed as active is changed from the second title 72 to the first title 71. That is, in the menu image 70, the animation display directed toward the left-hand side LS is made. In contrast, the image display device 3 causes the second mode information image 82 to slide out toward the right-hand side to the right end of the information display area 31c, and displays the first mode information image 81 so as to slide in from the left end of the information display area 31c toward the right-hand side.

The image display device 3 performs wraparound animation display when changing the title displayed as active from one end of the titles 71, 72, 73, 74, 75, and 76 to the other end. The wraparound animation display is a presentation that appears as if the cursor image 78 encircles the back-surface side of the titles 71, 72, 73, 74, 75, and 76. The wraparound animation display in a situation of changing the title displayed as active from the sixth title 76 to the first title 71 by the pressing operation on the right button will be described. The image display device 3 causes the cursor image 78 to fade out while moving the cursor image 78 from the position indicating the sixth title 76 to the right-hand direction. Then, the image display device 3 displays the cursor image 78 so as to fade in at the position on the left-hand side than the first title 71, and moves the cursor image 78 to the position at which the cursor image 78 indicates the first title 71.

As in the foregoing, the vehicular display device 1 of the present embodiment includes the image display device 3 that is arranged in front of the driver in the vehicle and configured to display an image. The image displayed in the information display area 31c of the image display device 3 includes the information image 80 and the menu image 70. The information image 80 is an image that displays the information corresponding to a selected mode out of the modes. The menu image 70 is an image in which the titles 71, 72, 73, 74, 75, and 76 corresponding to the respective modes are arranged in the lateral direction of the image. The display and hidden-display of the menu image 70 are switched by the image display device 3.

When the operating input to switch the modes is made while the menu image 70 is hidden, the image display device 3 displays the menu image 70 and performs animation display that changes the title displayed as active out of the titles 71, 72, 73, 74, 75, and 76 from the title corresponding to the mode before change to the title corresponding to the mode after the change. The vehicular display device 1 of the present embodiment, by performing the animation display of the menu image 70, can communicate to the user that the mode transition is correctly performed in response to the operating input. Thus, the vehicular display device 1 of the present embodiment can perform mode transition that matches the sense of the user.

The image display device 3 of the present embodiment causes the menu image 70 to be hidden when a predetermined time elapses while no operating input is made on the image displayed in the information display area 31c. Thus, the effective use of the display area of the menu image 70 and the improvement of the visibility by reducing the number of display images can be achieved.

The image display device 3 of the present embodiment displays the information image 80 corresponding to the mode after change so as to slide in in the lateral direction of the image. The sliding direction of the display to slide in is the opposite direction to the direction toward the title corresponding to the mode after change from the title corresponding to the mode before the change. Thus, as described in the following, the image display device 3 of the present embodiment can make the presentation at the time of mode change more intuitive.

For example, when the mode is changed from the first mode to the second mode, the title displayed as active is changed from the first title 71 to the second title 72 that is on the immediate right thereof. At this time, because the second mode information image 82 that is the information image 80 corresponding to the new mode slides in from the right-hand side, switching of modes is intuitive and easy to recognize. Meanwhile, in the case where only the animation display of the information image 80 is provided and the animation display of the mode change is not made on the menu image 70, the user may feel incongruity. For example, it is assumed that the menu image 70 was displayed in a state that the second title 72 corresponding to the mode after change is displayed as active. In this case, it may be difficult for the driver to intuitively recognize whether it is the mode transition in which his/her own button operation has been correctly reflected.

In contrast, the image display device 3 of the present embodiment performs animation display that changes the title displayed as active from the first title 71 to the second title 72. The active title changes toward the right-hand side RS from the first title 71 to the second title 72. The active title changes toward the right-hand side for the operating input of pressing the right button, which makes it easy for the user to intuitively recognize that the operating input and the behavior of the image display device 3 corresponding thereto match each other.

The display method for the vehicular display device in the present embodiment includes a displaying step of displaying the information image 80 and the menu image 70 on the image display device 3. The displaying step is illustrated in FIGS. 6, 7, and 4, for example. The information image 80 is an image corresponding to a selected mode out of the modes. The menu image 70 is an image in which the titles 71, 72, 73, 74, 75, and 76 corresponding to the respective modes are arranged in the lateral direction of the image.

When the operating input to switch the modes is made while the menu image 70 is hidden, at the displaying step, the menu image 70 is displayed as illustrated in FIG. 6, and as illustrated in FIGS. 6, 7, and 4, animation display that changes the title displayed as active out of the titles 71, 72, 73, 74, 75, and 76 from the first title 71 corresponding to the mode before change to the second title 72 corresponding to the mode after the change is performed. Thus, the display method for the vehicular display device in the present embodiment can perform the mode transition that matches the sense of the user.

Modifications of Embodiment

Modifications of the embodiment will be described. In the above-described embodiment, when switching the menu image 70 between display and hidden-display, the expansion and reduction of the information image 80 may be performed. For example, when the menu image 70 is switched from a display state to a hidden-display state, the information image 80 may be expanded toward the area where the menu image 70 has been displayed. When the menu image 70 is switched from the hidden-display state to the display state, the information image 80 may be reduced.

The sliding direction in the display of the information image 80 to slide out and slide in entailed in the mode change is not limited to those exemplified. For example, the changing direction of the title displayed as active may be the same direction as the sliding direction of the information image 80. The sliding direction of the display to slide out and slide in may be the vertical direction of the image.

The switching of the information image 80 entailed in the mode change is not limited to the display of sliding out and sliding in. The image display device 3 may cause the information image 80 of the mode before change to fade out on site, and display the information image 80 of the mode after the change so as to fade in, for example.

The animation display that changes the title displayed as active is not limited to those exemplified. This animation display only needs to be performed in an appropriate form. For example, the title to be displayed as active may be surrounded by a frame and displayed with the light and shade inverted within the frame. In this case, the animation display that moves the frame from the title before change to the title after the change may be performed. It is preferable that the animation display be made by taking a certain amount of time so that the user can easily recognize that the animation display is being made. The animation of moving the cursor image 78 is effective in terms of easily communicating the change of title displayed as active.

The menu image 70 may be displayed on the lower side of the information image 80, in place of being displayed on the upper side of the information image 80. The input unit that the operating input is input is not limited to the directional pad, and various input units can be employed.

The change of title displayed as active is not limited to those performed on the adjacent titles. Other titles may be present between the title corresponding to the mode before change and the title corresponding to the title after the change. In this case, the animation display of the menu image 70 the same as that of the above-described embodiment may be repeated a plurality of times. Alternatively, the title displayed as active may be changed at one stage from the title before the mode change to the title after the mode change without displaying as active the titles sandwiched between them.

The hidden-display determination condition is not limited to the one exemplified. For example, the display and hidden-display of the menu image 70 may be switched by the operating input by the user. In this case, because the menu image 70 is automatically displayed by the operating input of mode switch, an operation load of the user is reduced.

The disclosed content in the above-described embodiment and the modifications can be implemented in combination as appropriate.

The vehicular display device in the present embodiment includes the image display device that is arranged in front of the driver in the vehicle and configured to display an image. The image displayed in the information display area of the image display device includes the information image displaying the information according to a mode selected out of a plurality of modes and the menu image in which a plurality of titles corresponding to the respective modes are arranged in the lateral direction of the image and for which switching is made between display and hidden-display. When the operating input to switch the modes is made while the menu image is hidden, the image display device displays the menu image and performs animation display that changes the title displayed as active out of the titles from the title corresponding to the mode before change to the title corresponding to the mode after the change. The vehicular display device in the present invention provides an advantageous effect in that, by the animation display that changes the title displayed as active, the mode transition can be made to match the sense of the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular display device comprising:
    an image display device that is arranged in front of a driver in a vehicle and configured to display an image, wherein
    the image displayed in an information display area of the image display device includes an information image displaying information according to a mode selected out of a plurality of modes, and a menu image in which a plurality of titles corresponding to the respective modes are arranged in a lateral direction of the image and for which switching is made between display and hidden-display, and
    when an operating input to switch the modes is made while the menu image is hidden, the image display device displays the menu image and performs animation display that changes, in the displayed titles, a title displayed as active out of the titles from a title corresponding to a mode before change to a title corresponding to a mode after the change.

2. The vehicular display device according to claim 1, wherein
    the image display device causes the menu image to be hidden when a predetermined time elapses while no operating input is made on the image displayed in the information display area.

3. The vehicular display device according to claim 1, wherein
    the image display device displays the information image corresponding to the mode after the change so as to slide in in the lateral direction of the image, and
    the sliding direction of the display to slide in is an opposite direction to a direction toward the title corresponding to the mode after the change from the title corresponding to the mode before the change.

4. The vehicular display device according to claim 2, wherein
    the image display device displays the information image corresponding to the mode after the change so as to slide in in the lateral direction of the image, and
    the sliding direction of the display to slide in is an opposite direction to a direction toward the title corresponding to the mode after the change from the title corresponding to the mode before the change.

5. A display method for a vehicular display device, the display method comprising:
    a step of displaying, on an image display device arranged in front of a driver in a vehicle, an information image according to a mode selected out of a plurality of modes, and a menu image in which a plurality of titles corresponding to the respective modes are arranged in a lateral direction of the image, wherein the step of displaying includes displaying the menu image and performing animation display that changes, in the displayed titles, a title displayed as active out of the titles from a title corresponding to a mode before change to a title corresponding to a mode after the change, when an operating input to switch the modes is made while the menu image is hidden.

6. The vehicular display device according to claim 1,
wherein the animation display comprises changing the title displayed as active to the title corresponding to the mode after the change by:

changing the menu image from being hidden to being displayed, after changing the menu image from being hidden to being displayed, both sliding the menu image at least partly across the image display device in a first direction parallel to the lateral direction and also sliding the title displayed as active at least partly across the image display device in a second direction which is both parallel to the lateral direction and opposite to the first direction.

\* \* \* \* \*